US009596591B2

(12) United States Patent
Gouriou et al.

(10) Patent No.: US 9,596,591 B2
(45) Date of Patent: Mar. 14, 2017

(54) SWITCHING ACTIVE SUBSCRIBER IDENTITY OF A COMMUNICATION TERMINAL

(75) Inventors: Erwan Gouriou, Le Mans (FR); Erwan Preteseille, Arnage (FR)

(73) Assignee: Optis Circuit Technology, LLC, Plano, TX (US)

( * ) Notice: Subject to any disclaimer, the term of this patent is extended or adjusted under 35 U.S.C. 154(b) by 234 days.

(21) Appl. No.: 13/992,548

(22) PCT Filed: Dec. 9, 2011

(86) PCT No.: PCT/EP2011/006217
§ 371 (c)(1),
(2), (4) Date: Oct. 2, 2013

(87) PCT Pub. No.: WO2012/076181
PCT Pub. Date: Jun. 14, 2012

(65) Prior Publication Data
US 2014/0038601 A1 Feb. 6, 2014

Related U.S. Application Data (60) Provisional application No. 61/441,135, filed on Feb. 9, 2011.

(30) Foreign Application Priority Data

Dec. 10, 2010 (EP) .................................. 10368045

(51) Int. Cl.
*H04W 60/00* (2009.01)
*H04W 8/18* (2009.01)
*H04W 60/02* (2009.01)

(52) U.S. Cl.
CPC ............ *H04W 8/18* (2013.01); *H04W 8/183* (2013.01); *H04W 60/02* (2013.01)

(58) Field of Classification Search
USPC ...................................... 455/435.1
See application file for complete search history.

(56) References Cited

U.S. PATENT DOCUMENTS

2004/0264414 A1 12/2004 Dorenbosch
2005/0202816 A1* 9/2005 Warsta ................. H04W 8/04
455/433

(Continued)

FOREIGN PATENT DOCUMENTS

CN 101242600 A 8/2008
CN 101287217 A 10/2008

(Continued)

OTHER PUBLICATIONS

3GPP TS 24.008 v10.0.0: 3rd Generation Partnership Project; Technical Specification Group Core Network and Terminals;Mobile radio interface Layer 3 specification;Core network protocols; Stage 3, Sep. 2010, (Release 10 ).*

(Continued)

*Primary Examiner* — Kathy Wang-Hurst
*Assistant Examiner* — Said Elnoubi
(74) *Attorney, Agent, or Firm* — Spencer C. Patterson; Grable Martin Fulton PLLC (57) ABSTRACT

A method is disclosed of switching the active subscriber identity of a communication terminal which is capable at each moment in time of having only one active subscriber identity. An active subscriber identity switch from a first subscriber identity to a second subscriber identity is initiated. At least one parameter associated with a time of expiry of a timer associated with the first subscriber identity is stored. The first subscriber identity is deactivated and the second subscriber identity is activated. If an active subscriber identity switch from the second subscriber identity to the first subscriber identity is initiated and the first subscriber identity is activated, it may be determined whether (Continued)

the time of expiry of the timer associated with the first subscriber identity has passed. Network registration of the first subscriber identity may be performed only if the time of expiry of the timer associated with the first subscriber identity has passed. Corresponding computer program product, controller, arrangement and communication terminal are also disclosed.

17 Claims, 2 Drawing Sheets

(56) References Cited

U.S. PATENT DOCUMENTS

| | | | |
|---|---|---|---|
| 2007/0298801 A1 | 12/2007 | Kim et al. | |
| 2008/0280608 A1* | 11/2008 | Yu | H04W 60/04 455/435.1 |
| 2009/0215458 A1* | 8/2009 | Kim | H04L 1/1848 455/435.1 |
| 2010/0311467 A1* | 12/2010 | Wu | H04W 8/205 455/558 |
| 2011/0275371 A1 | 11/2011 | Roger | |
| 2012/0135715 A1 | 5/2012 | Kang et al. | |

FOREIGN PATENT DOCUMENTS

| | | | | |
|---|---|---|---|---|
| EP | 1 223 768 A1 | 7/2002 | | |
| EP | 1223768 A1 * | 7/2002 | | |
| EP | 2 046 085 A1 | 4/2009 | | |
| EP | 2 214 444 A1 | 8/2010 | | |
| JP | EP 1223768 A1 * | 7/2002 | ........... | G06Q 20/354 |
| KR | WO 2010140781 A2 * | 12/2010 | ........... | H04W 8/183 |
| TW | 535384 B | 6/2003 | | |
| WO | 2010140781 A2 | 12/2010 | | |
| WO | WO 2010140781 A2 * | 12/2010 | | |

OTHER PUBLICATIONS

3GPP TS 24.008 V10.0.0, 3rd Generation Partnership Project; Technical Specification Group Core Network and Terminals;Mobile radio interface Layer 3 specification;Core network protocols; Stage 3, Sep. 2010.*
3GPP TS 24.008 v10.0.0, 3rd Generation Partnership Project; Technical Specification Group Core Network and Terminals; Mobile radio interface Layer 3 specification; Core network protocols; Sep. 2010.*
Ahmed, Zaheer et al., "A Navigation Device with MAC Supporting Multiple Physical Networks for Extended Coverage and Operations," IEEE Transactions on Consumer Electronics, IEEE Service Center, New York, NY, USA, vol. 54, No. 3, Aug. 1, 2008, pp. 1103-1109, XP011235554, ISSN: 0098-3063, DOI:10.1109/TCE.2008.4637594.
International Search Report issued in corresponding International application No. PCT/EP2012/000710, date of mailing Apr. 18, 2012.
3GPP TS 24.008, V10.0.0, 3rd Generation Partnership Project; Technical Specification Group Core Network and Terminals; Mobile radio interface Layer 3 specification; Core network protocols; Stage 3 (Release) 10, 3GPP, Sep. 1, 2010, pp. 1; 84-91, XP002630726, retrieved from internet: URL:http://www.3gpp.org/ftp/Specs/archive/24_series/24.008/24008-a00.zip.
International Search Report issued in corresponding International application No. PCT/EP2011/006217, date of mailing Feb. 14, 2012.
International Preliminary Report on Patentability mailed Aug. 29, 2013 in related International Application No. PCT/EP2012/000710.

* cited by examiner

SWITCHING ACTIVE SUBSCRIBER IDENTITY OF A COMMUNICATION TERMINAL

TECHNICAL FIELD

The present invention relates generally to the field of communication terminals and methods for use in such terminals. More particularly, it relates to switching of active subscriber identity of a communication terminal.

BACKGROUND

In typical cellular applications, an active subscriber identity needs to be registered in a corresponding network to be able to perform communication via the network. Such communication may, for example, comprise initiate and receive calls, SMS (short message service) and the like. Thus, an aim of performing a registering procedure towards a network is to inform the network that the mobile terminal associated with the subscriber identity is switched on and is able to receive paging and other messages from the network.

When a subscriber identity performs a de-registration from a network, a purpose is to inform the network that the mobile terminal associated with the subscriber identity is switched off and, hence, that paging and other messages should not be broadcasted anymore.

A registered subscriber identity may also perform update procedures towards the network at defined moments in time. This may for example be the case when the location of the mobile terminal has changed.

Another example is that a typical network may require a registered subscriber identity to perform a periodic update procedure towards the network to confirm its active status (and possibly its location).

Typically, the network maintains a timer for this purpose. The timer is reset whenever a subscriber identity performs a registration or update procedure. If the timer expires, the network typically considers the subscriber identity as de-registered. This has the advantage that the network will not waste efforts in trying to reach a subscriber identity that has become un-reachable without having performed the de-registration procedure (e.g. due to loss of coverage, low battery, battery removal, etc.). A typical timer setting may be that it expires after approximately 6 hours or more than 6 hours. The example timer T3212 in 3GPP specification TS24.008 has an expiry setting of 6 hours.

A corresponding timer (typically shorter than the network timer) is maintained in the mobile terminal for the subscriber identity. This timer is also reset whenever a subscriber identity performs a registration or update procedure. When the timer expires, a periodic update procedure for the subscriber identity should typically be initiated by the mobile terminal. Examples of such timers are the timers T3212 and T3312 in 3GPP specification TS24.008. The timer duration value(s) may typically be either strictly defined in an applicable standard or broadcast by the network (e.g. in a System Information signaling). The timer maintained in the mobile terminal for the subscriber identity typically has a timer duration value that is directly related to the timer duration value of the corresponding timer maintained in the network.

Related to a subscriber identity, a corresponding context is maintained in the network for that particular subscriber identity. The context may, among other things, maintain information regarding the status of the subscriber identity (e.g. registered or de-registered) and location information of the subscriber identity (e.g. home location and temporary location, such as local temporary identity—TMSI (temporary mobile subscriber identity)/P-TMSI (packet temporary mobile subscriber identity)). Some information of the context may be always maintained (e.g. status and home location), while other information may only be maintained while the subscriber identity is registered (e.g. temporary location).

The context is updated when a subscriber identity is registered, updated and/or de-registered in the network. The context may also be updated at other times.

Due to this context, the network is able to know if a particular subscriber identity is able to receive messages (e.g. paging) or not, and at which location the network should transmit the messages.

For a single subscriber identity device (e.g. a single SIM phone), the registration procedure is typically performed at power on and the de-registration at power off.

For a dual or multiple subscriber identity device that can only have a limited number of subscriber identities active at each moment in time (e.g. a dual SIM single standby—DSSS—phone), registration/de-registration procedures are typically also performed at a switch of active subscriber identity.

A DSSS phone is equipped with two subscriber identity means (e.g. two SIM sockets and two copies any hardware directly associated with the SIM sockets), but is otherwise similar to a single subscriber identity device (e.g. having single SIM software and hardware architecture). From a user perspective, a DSSS phone provides the possibility to use two different subscriber identities in one single device without having to perform a physical subscriber identity module exchange. However, only one subscriber identity is available at each moment in time for a DSSS phone. When one subscriber identity is activated by the user, the other subscriber identity is in an off state. Thus, the user does not have any access to the other subscriber identity and no communication can be performed for the other subscriber identity.

The behavior towards the network of DSSS is not specified in any standard. Typically, single subscriber identity device behavior is adopted by default. Thus, when a user initiates a switch of active subscriber identity on a DSSS phone, a procedure is performed similar to that of a SIM removal and insertion of another SIM in a single SIM device.

In order to switch from one subscriber identity to another in a DSSS device, a complete re-initialization to the other subscriber identity of the telecom stack of the device is typically needed. Also typically, various switch off/on procedures (including network procedures such as de-register/register and detach/attach for CS (circuit switched) and PS (packet switched) domains) will be performed for the respective subscriber identities to be de-activated and activated respectively.

The registration and de-registration processes takes some time. In an example scenario, the de-registration/registration processes of a subscriber identity switch in a DSSS device typically takes approximately 8 seconds of the totally 15-30 seconds needed for the subscriber identity switch.

If several subscriber identity switches are performed in sequence, there is a risk of signaling overload towards the network. Naturally, a situation of signaling overload should preferably be avoided.

Naturally, the operations performed and the signaling involved in association with registration/de-registration also consumes power.

These problems are experienced for subscriber identity switches in both single and multiple subscriber identity devices. Some problems are typically more pronounced in multiple subscriber identity devices, for example the delay problem (since the delay due to the problems described above comprise a larger portion of the total time required for a subscriber identity switch in a multiple subscriber identity device than in a single subscriber identity device).

Therefore, there is a need for improved methods and arrangements of active subscriber identity switch.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide improved methods and arrangements of active subscriber identity switch.

According to a first aspect of the invention, this is achieved by a method of switching active subscriber identity of a communication terminal, wherein the communication terminal is capable at each moment in time of having only one active subscriber identity. The method comprises initiating an active subscriber identity switch from a first subscriber identity to a second subscriber identity, storing at least one parameter associated with a time of expiry of a timer associated with the first subscriber identity, de-activating the first subscriber identity, and activating the second subscriber identity.

In some embodiments, the method may further comprise (in association with the step of storing the at least one parameter associated with the time of expiry of the timer) storing a location information of the communication terminal associated with the first subscriber identity.

In some embodiments, the method may further comprise initiating an active subscriber identity switch from the second subscriber identity to the first subscriber identity, de-activating the second subscriber identity, and activating the first subscriber identity. The step of activating the first subscriber identity may comprise determining whether the time of expiry of the timer associated with the first subscriber identity has passed, and performing network registration of the first subscriber identity only if the time of expiry of the timer associated with the first subscriber identity has passed.

The at least one parameter associated with the time of expiry of the timer may comprise a time left until the timer expires. Then, the step of determining whether the time of expiry of the timer has passed may comprise determining whether an elapsed time since the first subscriber identity was active exceeds the stored time left until the timer expires.

In some embodiments, the step of activating the first subscriber identity may further comprise determining whether the stored location information associated with the first subscriber identity corresponds to a current location information of the communication terminal, and performing network registration of the first subscriber identity only if the stored location information associated with the first subscriber identity does not correspond to the current location information of the communication terminal.

The steps of de-activating the first subscriber identity and activating the second subscriber identity may comprise resetting a telecommunication stack of the communication terminal to a state associated with the second subscriber identity.

The communication terminal may be a multiple subscriber identity terminal, and the step of initiating the active subscriber identity switch may comprises receiving a subscriber identity switch request via a user interface of the communication terminal.

The communication terminal may be a single subscriber identity terminal, and the step of initiating the active subscriber identity switch may comprise detecting a subscriber identity switch at a subscriber identity unit of the communication terminal.

A second aspect of the invention is a computer program product comprising a computer readable medium, having thereon a computer program comprising program instructions, the computer program being loadable into a data-processing unit and adapted to cause execution of the method according to the first aspect when the computer program is run by the data-processing unit.

A third aspect of the invention is a controller for a communication terminal, wherein the communication terminal is capable at each moment in time of having only one active subscriber identity. The communication terminal comprises a telecommunication stack adapted to support a currently active subscriber identity, at least one memory unit adapted to store, for each of a plurality of subscriber identities, at least one parameter associated with a time of expiry of a timer associated with the respective subscriber identity and the controller.

The controller is adapted to initiate an active subscriber identity switch of the communication terminal, cause extraction of the at least one parameter associated with the time of expiry of the timer associated with the currently active subscriber identity from the telecommunication stack and storing of the extracted at least one parameter in the at least one memory unit, de-activate the currently active subscriber identity, and activate another subscriber identity.

In some embodiments, the at least one memory unit may be further adapted to store, for each of the plurality of subscriber identities, a location information of the communication terminal associated with the respective subscriber identity. Then, the controller may be further adapted to (in association with causing extraction and storing of the at least one parameter associated with the time of expiry of the timer) cause extraction of the location information of the communication terminal associated with the currently active subscriber identity from the telecommunication stack and storing of the extracted location information in the at least one memory unit.

The controller may be further adapted to determine whether the time of expiry of the timer associated with the another subscriber identity has passed, and cause the communication terminal to perform network registration of the another subscriber identity only if the time of expiry of the timer associated with the another subscriber identity has passed.

The controller may be further adapted to determine whether stored location information associated with the another subscriber identity corresponds to a current location information of the communication terminal, and cause the communication terminal to perform network registration of the another subscriber identity only if the stored location information associated with the another subscriber identity does not correspond to the current location information of the communication terminal.

A fourth aspect of the invention is an arrangement adapted to switch active subscriber identity of a communication terminal, wherein the communication terminal is capable at each moment in time of having only one active subscriber identity. The arrangement comprises a telecommunication stack adapted to support a currently active subscriber identity, at least one memory unit adapted to store, for each of a plurality of subscriber identities, at least one parameter associated with a time of expiry of a timer associated with the respective subscriber identity, and the controller of the third aspect.

A fifth aspect of the invention is a communication terminal comprising the arrangement according to the fourth aspect.

The communication terminal may be a multiple subscriber identity terminal, further comprising a user interface for inputting a subscriber identity switch request.

In some embodiments, the third, fourth and fifth aspects of the invention may additionally have features identical with or corresponding to any of the various features as explained above for the first aspect of the invention and vice versa.

Thus, in some embodiments, the first and second subscriber identities of the active subscriber identity switch from a first subscriber identity to a second subscriber identity comprise a single subscriber identity. Similarly, the currently active subscriber identity and the another subscriber identity of the active subscriber identity switch may comprise a single subscriber identity according to some embodiments.

An advantage of some embodiments of the invention is that the time required for a switch of active subscriber identity is reduced.

In some embodiments, a time required for a switch of active subscriber identity in a multiple subscriber identity device may be reduced by approximately 30-50%.

Another advantage of some embodiments of the invention is that power consumption of a device performing a switch of active subscriber identity is reduced.

Another advantage of some embodiments of the invention is that less signaling between terminal device and network is required in association with a switch of active subscriber identity.

Yet another advantage of some embodiments of the invention is that the service as experienced by the user remains unaffected.

BRIEF DESCRIPTION OF THE DRAWINGS

Further objects, features and advantages of the invention will appear from the following detailed description of embodiments of the invention, with reference being made to the accompanying drawings, in which.

DETAILED DESCRIPTION

In the following, embodiments of the invention will be described where alternative procedures for switching an active subscriber identity of a mobile terminal are used.

Embodiments of the invention are equally applicable to subscriber identity switches in a single subscriber identity device (e.g. SIM removal and insertion of the same or a different SIM in a single SIM phone) and to subscriber identity switches of a multiple subscriber identity device where the device is capable at each moment in time of having only one active subscriber identity (e.g. a DSSS phone). Embodiments of the invention are also applicable to any situation where a telecommunication stack of the mobile terminal is switched off (e.g. during power off or flight mode) and then re-initiated for the same or different subscriber identity. Advantages of embodiments of the invention may be experienced for all such cases.

In the following description of embodiments, the DSSS phone will be used as example for illustrative purposes.

For a typical DSSS phone, the active SIM has status registered and the non-active SIM has status de-registered. When a SIM switch is performed in the typical DSSS phone the network experiences a full de-registration and SIM de-activation procedure for the SIM going from active to non-active, and a full registration and SIM activation and reading procedure for the SIM going from non-active to active.

As remarked above, these procedures have several disadvantages, including time delay, power consumption, and signaling overload.

On the other hand, not performing these procedures may have serious impact on quality of service, since nothing is done to maintain an appropriate registration status in the network. If, for example, active SIM switches are done in a DSSS phone without network de-registration/registration, there is a severe risk that the network timer expires for one SIM while it is not active in the phone. Thus, when that SIM becomes active again the network has changed the status in the context for that SIM to de-registered. Thus, the network will not attempt to reach that SIM even if it has a message (e.g. a page) to deliver addressed to it.

Typically, the periodic update timer is running only for the currently active subscriber identity (e.g. currently served by a telecom stack of the mobile terminal). The timer may be kept running even during e.g. loss of coverage. Thereby, a subscriber identity gaining coverage again may be able to determine if the network has de-registered it or not.

Embodiments of the invention utilizes the periodic update timer functionality to determine when it is necessary to register the new active SIM of a SIM switch, and performs network registration of the new active SIM only when it is necessary.

Thus, de-registration and registration is avoided to a large extent in embodiments of the invention. One advantage of this is that the time consumption of the SIM switch is reduced. That de-registration and registration is not completely avoided ensures that the service accessibility is not impaired. The mobile terminal behavior may be adopted based on how the network monitors the subscriber identity status (registered/de-registered). For example, de-registration may be completely avoided and it is left to the network to de-register a SIM which has been inactive for a long time (e.g. as if the SIM experienced out-of-coverage conditions). If certain parameters are kept track of, it may be possible for the mobile terminal to determine whether or not the network has de-registered a SIM. Thus, when that SIM is activated again, the mobile terminal can determine if network registration is necessary or if the network has not yet noticed that the SIM was in-active and the SIM is still registered in the network.

Hence, network registration/de-registration signaling is optimized according to embodiment of the invention.

In some embodiments, it is determined that network registration of a SIM is necessary if the mobile terminal periodic update timer of that SIM has elapsed while that SIM was non-active. For this purpose, information associated with the timer may be maintained even when that SIM is not active as will be explained further in the following.

In some embodiments, it is determined that network registration of a SIM is necessary if the mobile terminal location has changed while that SIM was non-active. For this purpose, information associated with the location may be maintained even when that SIM is not active as will be explained further in the following.

In some embodiments a combination of the conditions above is applied. Thus, it is determined that network registration of a SIM is necessary if the mobile terminal periodic update timer of that SIM has elapsed while that SIM was non-active or if the mobile terminal location has changed while that SIM was non-active.

According to some embodiments of the invention a de-activation of a SIM comprises storing of a remaining time to expiry of the mobile terminal's periodic update timer for that SIM, storing of the latest location update information for that SIM, and de-activating the SIM without network de-registration.

According to some embodiments of the invention an activation of a SIM comprises checking stored timer and location information for that SIM, and performing network registration of the SIM only if:

the stored location information differs from the current location information (e.g. the latest location update information) of the mobile terminal, or the elapsed time since the SIM was de-activated exceeds the stored remaining time to expiry of the timer.

To keep track of the elapse or not of the periodic update timer several options exist. One option is to store (at de-activation) a remaining time until expiry of the timer and to (at activation) compare this remaining time with the elapsed time since de-activation as above. Another option is to store (at de-activation) a current timer value and to (at activation) compare a difference between a maximum timer value and this current timer value with the elapsed time since de-activation as above. Other possibilities may also exist that will fall under the general wording of storing (at de-activation) a parameter associated with a time of expiry of a timer and determining (at activation) whether the time of expiry of the timer associated with the first subscriber identity has passed.

Figure 1:
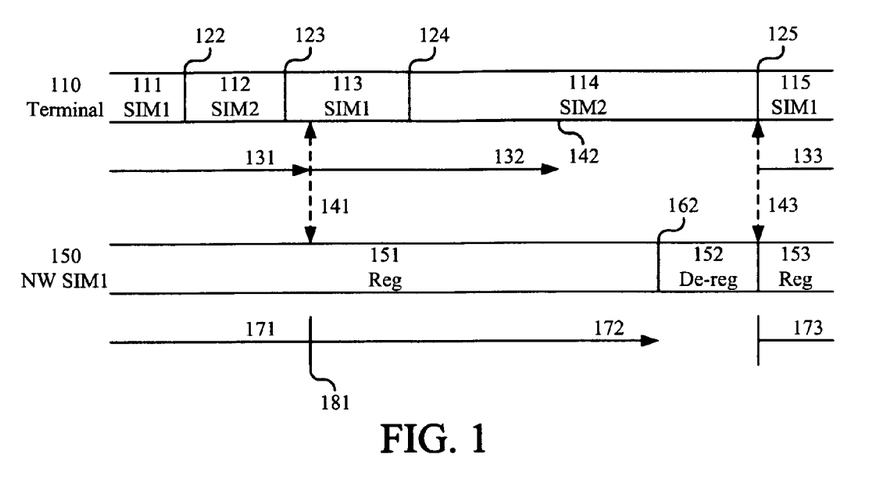
FIG. 1 is a schematic timing diagram illustrating subscriber identity procedures toward a network according to some embodiments of the invention.

FIG. 1 is a schematic timing diagram that illustrates status in a terminal 110 (e.g. a DSSS phone) for two SIMs (SIM1 and SIM2). FIG. 1 also illustrates SIM1 status in a corresponding network 150, and SIM1 related signaling 141, 143 between the phone and the network. The network status and signaling for SIM2 is not show in the figure, but may function correspondingly. The example is equally applicable to circuit switched and packet switched services.

Initially SIM1 is active in the terminal (as illustrated by 111) and registered in the network context (as illustrated by 151). A network time is running for monitoring the registered status (as illustrated by 171) and a corresponding periodic update timer is running in the terminal (as illustrated by 131).

At time instant 122, a first SIM switch takes place in the terminal 110. This may, for example, be a soft switch of a multiple SIM terminal or a physical SIM removal and insertion. According to embodiments of the invention, one or more parameters relating to the periodic update timer 131 is stored and the telecom stack of the terminal 110 is re-initiated for SIM2 (thus, the timer 131 associated with SIM1 is no longer running).

After time instant 122, SIM2 is active in the terminal (as illustrated by 112) and SIM1 is accordingly in-active. However, since (according to embodiments of the invention) no de-registration of SIM1 is made at time instant 122, SIM1 is still registered in the network context (as illustrated by 151).

At time instant 123, a second SIM switch takes place in the terminal 110. After time instant 123, SIM1 is active again in the terminal (as illustrated by 113).

Based on the stored parameter relating to the periodic timer 131, the terminal 110 may determine when the periodic update timer would have expired if it had been kept running. Since the periodic update timer 131 was supposed to expire after time instant 123 in this case, the terminal 110 may conclude that SIM1 should still be registered in the network context (which is correct as illustrated by 151 and the fact that the network timer 171 has not expired).

Thus, there is no need to register SIM 1 in the network at time instant 123. When the telecom stack of the terminal 110 is re-initiated for SIM1, the timer 131 is loaded with an appropriate value (e.g. a stored remaining time to expiry minus the elapsed time between time instants 122 and 123, or a stored timer value plus the elapsed time between time instants 122 and 123) and continues to run.

At time instant 181, the periodic update timer 131 expires and the terminal performs SIM1 update signaling 141 towards the network to keep SIM1 registered. The update procedure comprises resetting of the network timer, which now starts running from its reset value (as illustrated by 172), and the periodic update timer, which also starts running from its reset value (as illustrated by 132).

At time instant 124, a third SIM switch takes place in the terminal 110. One or more parameters relating to the periodic update timer 132 is stored and the telecom stack of the terminal 110 is re-initiated for SIM2 (thus, the timer 132 associated with SIM1 is no longer running).

After time instant 124, SIM2 is active in the terminal (as illustrated by 114) and SIM1 is accordingly in-active. As before, SIM1 is still registered in the network context (as illustrated by 151).

At time instant 162, the network timer 172 for SIM1 expires. Hence the network autonomously changes the network status for SIM1 to de-registered (as illustrated by 152).

At time instant 125, a fourth SIM switch takes place in the terminal 110. After time instant 125, SIM1 is active again in the terminal (as illustrated by 115).

Based on the stored parameter relating to the periodic timer 132, the terminal 110 may determine when the periodic update timer would have expired if it had been kept running. Since the periodic update timer 132 was supposed to expire at time instant 142 in this case, before time instant 125, the terminal 110 may conclude that SIM1 should probably be de-registered in the network context (which is correct as illustrated by 152 and the fact that the network timer 172 has expired).

Thus, SIM1 needs to be registered in the network at time instant 125. The terminal performs SIM1 registration signaling 143 towards the network. Hence, after time instant 125, SIM1 is registered in the network context (as illustrated by 153).

The registration procedure comprises resetting of the network timer, which starts running from its reset value (as illustrated by 173). The registration procedure also comprises resetting of the periodic update timer (as part of re-initiating the telecom stack of terminal 110), which starts running from its reset value (as illustrated by 133).

It may be noted that if a SIM switch had taken place between time instants 142 and 162, the terminal 110 would have concluded that SIM1 should probably be de-registered in the network context (since the periodic update timer 132 was supposed to already have expired). However, the network timer 172 does not expire until time instant 162, so SIM1 is actually still registered in the network context (as illustrated by 151) and the conclusion by the terminal is incorrect. Hence, the terminal would have performed SIM1 registration signaling towards the network even if it was not absolutely necessary. Such de-registration is, however, completely analogue to the typical course of action in a prior art system. Hence, it does not in any way diminish the benefits provided by embodiments of the invention. This particular situation rises due to that, in this scenario, the duration of the network timer is longer than the duration of the periodic update timer of the terminal. The respective timer durations may (possibly subject to applicable standard constraints) be regulated by standards, by operators, or (in the case of the terminal periodic update timer) by the terminal itself.

Figure 2:
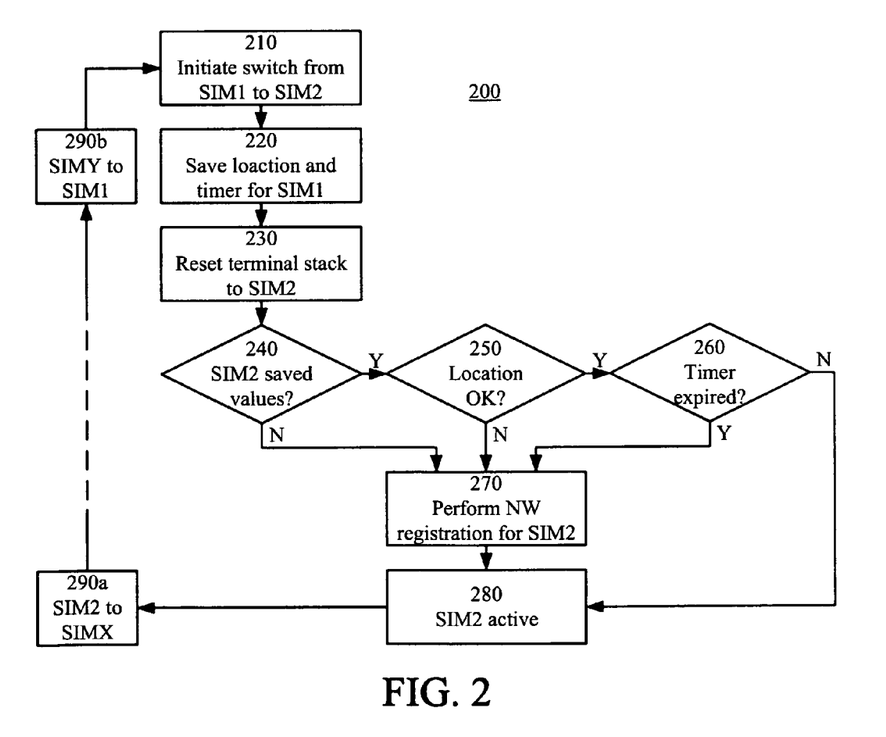
FIG. 2 is a flowchart illustrating example method steps according to some embodiments of the invention.

FIG. 2 illustrates an example method 200 according to some embodiments of the invention.

The method starts in step 210, where a subscriber identity switch is initiated. As mentioned before, this may be a soft subscriber identity switch of a multiple subscriber identity device, a physical switch subscriber identity of a single or multiple subscriber identity device, a removal and insertion of a same SIM of a device, or any situation where a telecommunication stack of a device is not active for a particular subscriber identity (e.g. switched off such as during power off or flight mode) and then re-initiated for the same or a different subscriber identity. The subscriber identity switch may, for example, be initiated when a subscriber identity switch request is received or detected via a user interface of the device, or when a subscriber identity switch is detected (e.g. at a subscriber identity unit such as a SIM slot of the device).

In the following, a soft SIM switch between the two SIMs of a DSSS phone will be used as a non-limiting example, and step 210 thus illustrates a switch from SIM1 to SIM2.

In step 220 one or more parameters relating to the current terminal state are stored as associated with SIM1. In some embodiments, as also illustrated in step 220, parameters related to location of the terminal and to a SIM1 timer are stored. The location information may, for example, be a current temporary location, such as current local temporary identity, or information of a previous (e.g. last/latest) location update towards the network. The location information may, additionally or alternatively, comprise one or more of current/last/latest serving cell information (comprising e.g. frequency band, radio access technology, etc.), mobile terminal identity value(s) (e.g. TMSI, P-TMSI, etc.), and ciphering parameters, etc.

Examples of parameters relating to the timer have been elaborated on above. The storing of parameters in step 220 may be performed in parallel or in sequence in any appropriate order.

The telecommunication stack of the terminal is then initiated to a state that corresponds to SIM2 operations as illustrated in step 230. It is noted that the stack is initiated without performing of any de-registration signaling procedures towards the network. Thus, de-activation of SIM1 is an entirely local procedure in these embodiments. In alternative embodiments, step 230 may be performed at a later point in time, e.g. after steps 240, 250, 260.

If there are no previously stored parameters associated with SIM2 (no path out of step 240), the terminal performs a network registration signaling procedure towards the network for SIM2 in step 270 and the process continues to step 280.

If, however, there are previously stored parameters associated with SIM2 (yes path out of step 240), the terminal continues to steps 250 and 260. It is noted that steps 250 and 260 may be performed in parallel or in sequence in any appropriate order.

In this example, the yes path out of step 240 leads to step 250, where it is checked whether or not the relevant location information (e.g. temporary location area) of the terminal has changed since SIM2 was last active. If the location information has changed (no path out of step 250), the terminal performs a network registration signaling procedure towards the network for SIM2 in step 270 and the process continues to step 280. If the location information has not changed (yes path out of step 250), the process continues to step 260, where it is determined whether or not the SIM2 periodic update timer of the terminal would have expired since SIM2 was last active. If the timer would have expired (yes path out of step 260), the terminal performs a network registration signaling procedure towards the network for SIM2 in step 270 and the process continues to step 280. If the timer would not have expired (no path out of step 260), the process continues directly to step 280 and no network registration signaling procedure towards the network for SIM2 is performed. In the latter case, the periodic update timer for SIM2 may also be loaded with an appropriate value based on the stored timer parameter for SIM2.

In step 280, SIM2 is active, and each time a SIM switch is initiated the corresponding process (210-280) is performed as illustrated by steps 290*a* and 290*b*.

Figure 3:
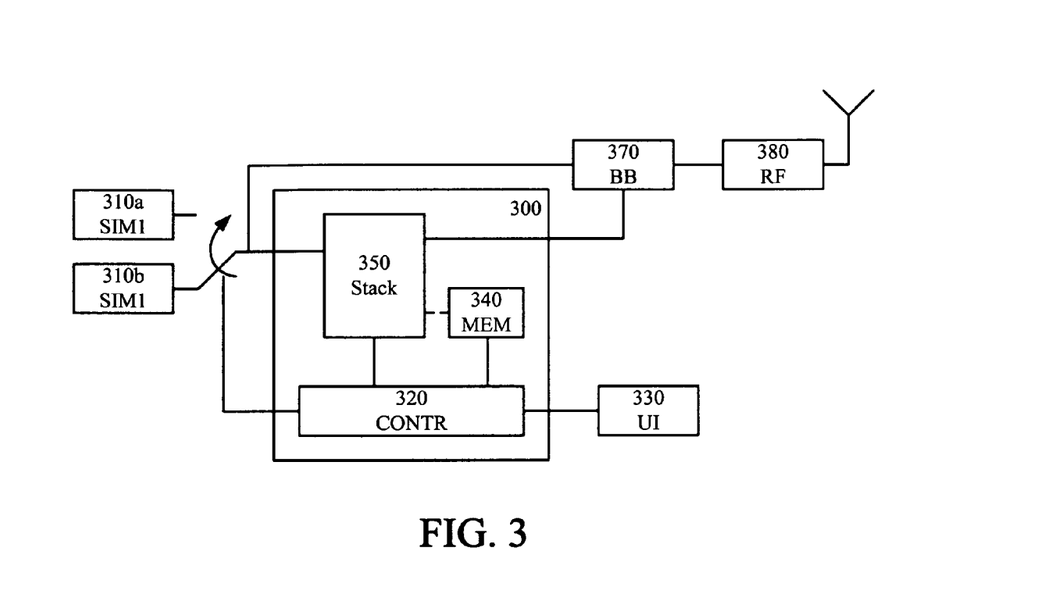
FIG. 3 is a block diagram illustrating an example arrangement according to some embodiments of the invention.

FIG. 3 is a schematic drawing illustrating an example arrangement 300 according to some embodiments of the invention.

The arrangement comprises a controller 320, a telecom stack 350 and one or more memory units 340. The controller 320 is connected to the stack 350 and the memory 340 and to a user interface 330. The stack 350 is connected to the memory 340 either directly or via the controller 320.

The arrangement 300 and the user interface 330 may be comprised in a mobile terminal device which also comprises one or more subscriber identity means (e.g. SIM card slots) for associating one or more subscriber identities 310*a*, 310*b* with the mobile terminal device. In the example of FIG. 3, there are two subscriber identities 310*a*, 310*b* associated with the device and they are (one at a time) connected or otherwise associated with the stack 350 via a switch which is controlled by the controller 320.

The mobile terminal device may also comprise other units (which may be associated with the stack 350 and the subscriber identities 310*a*, 310*b*), such as a baseband unit 370 and a radio frequency unit 380 for communicating with one or more telecommunication networks.

The arrangement 300 is adapted to control a switching of active subscriber identity of the device. For example, the arrangement 300 may be adapted to perform method steps as described in connection with FIG. 2.

Typically, the device comprising the arrangement 300 is capable at each moment in time of having only one active subscriber identity 310*a*, 310*b*. The telecommunication stack 350 is adapted to support a currently active subscriber identity. The memory unit 340 is adapted to store, for each subscriber identity, the parameters as described in step 220 of FIG. 2. The extraction (e.g. from the stack 350) and storing of the parameters is controlled by the controller 320 when a SIM switch is initiated as in step 210 of FIG. 2 (for example via the user interface 330 or by detection of a physical SIM switch at the subscriber identity means).

When the extraction and storing of the parameters is completed, the controller 320 causes switching of the active SIM and re-setting of the stack 350 to the new active SIM (e.g. as described in step 230 of FIG. 2), and checks whether or not network registration is needed (e.g. as described in steps 240-260 of FIG. 2). If registration is needed this is performed as in step 270 of FIG. 2 via the baseband unit 370 and radio frequency unit 380.

Figures 4, 5:
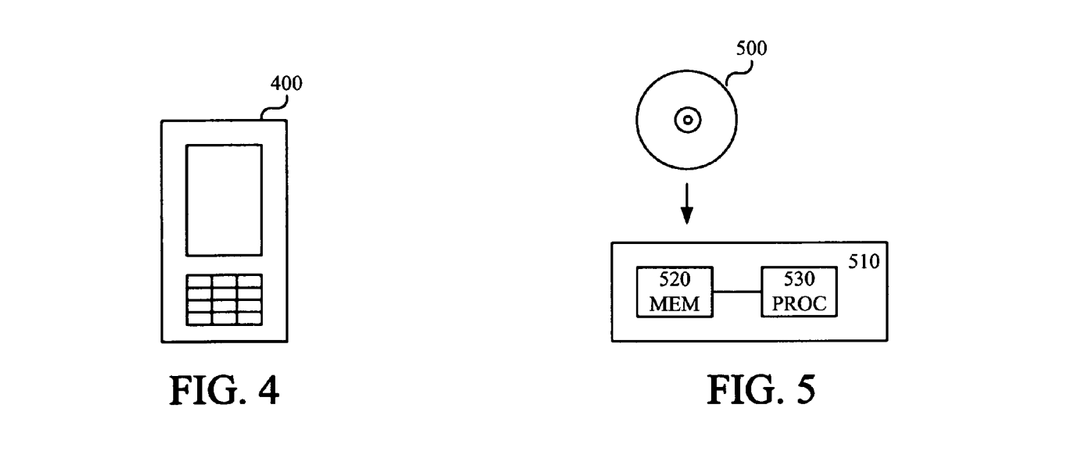
FIG. 4 is a schematic drawing illustrating a mobile terminal comprising an arrangement according to some embodiments of the invention.
FIG. 5 is a schematic drawing illustrating a computer readable medium according to some embodiments of the invention and an associated data-processing unit.

FIG. 4 illustrates an example mobile terminal 400. The mobile terminal may be connected, through a radio link, to a network. The mobile terminal may comprise an arrangement for control of switching of active subscriber identities according to embodiments of the invention, for example the arrangement described in connection to FIG. 3.

The mobile terminal 400 is illustrated as a mobile telephone in a schematic front view. The mobile terminal may further comprise one or more antennas and a man-machine interface for operating the mobile terminal (e.g. a display, a keypad, a loudspeaker, and a microphone).

The example mobile terminal 400 is adapted to connect to one or more mobile telecommunication network via a wireless link. A user of the mobile terminal may use conventional circuit-switched telecommunication services such as voice calls, data calls, video calls, and fax transmissions, and/or packet-based services such as electronic messaging, VoIP, Internet browsing, electronic commerce, etc. To this end, the mobile terminal 400 and the network may be compliant with at least one mobile telecommunication standard.

The described embodiments of the invention and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention. The electronic apparatus may, for example, be a portable or handheld mobile radio communication equipment, a mobile radio terminal, a mobile telephone, a pager, a communicator, an electronic organizer, a smartphone, a computer, a notebook, a plug-in card, or an embedded drive.

According to some embodiments of the invention, a computer program product comprises a computer readable medium such as, for example, a diskette, a USB-stick or a CD-ROM. Such a computer readable medium is illustrated by the CD-ROM 500 of FIG. 5. The computer readable medium 500 may have stored thereon a computer program comprising program instructions. The computer program may be loadable into a data-processing unit 510, which may, for example, be comprised in a mobile terminal. When loaded into the data-processing unit 510, the computer program may be stored in a memory 520 associated with or integral to the data-processing unit. According to some embodiments, the computer program may, when loaded into and run by the data-processing unit (for example by processor 530), cause the data-processing unit to execute method steps according to, for example, the method shown in FIG. 2.

It should be noted that embodiments of the invention are equally applicable to single SIM devices, dual SIM devices and multiple SIM devices as have been elaborated on above.

Also, even though the subscriber identities typically reside in local memory areas of SIM cards which are physically inserted into corresponding SIM card readers in a mobile terminal; this must not be the case in all embodiments. In some embodiments, the subscriber identities may be provided to the mobile terminal in the form of a SIM software application executed in the terminal, and/or as a virtual SIM which is "stolen" or "borrowed" from another device and is rendered accessible to the terminal by way of a (wireless or other) interface.

Furthermore, it should be noted that embodiments of the invention are equally applicable to mobile terminals as to stationary devices associated with a cellular telecommunication network (e.g. routers, power consumption meters, home alarms, etc). Such stationary devices are configured to be connected to a cellular communication network and are, when connected, seen as terminals by the network.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method of switching active subscriber identity of a communication terminal, wherein the communication terminal is capable at each moment in time of having only one active subscriber identity, the method comprising:
   maintaining, while a first subscriber identity is active and registered, a first periodic timer associated with the first subscriber identity;
   initiating an active subscriber identity switch from the first subscriber identity to a second subscriber identity and maintaining the first subscriber identity as registered;
   stopping the first periodic timer in response to the initiation of the active subscriber identity switch;

storing a timer value based on a time when the first periodic timer is stopped;

de-activating the first subscriber identity;

activating the second subscriber identity;

initiating an active subscriber identity switch from the second subscriber identity to the first subscriber identity;

de-activating the second subscriber identity; and activating the first subscriber identity, wherein the step of activating the first subscriber identity comprises:

determining, based on at least the stored timer value, whether a time of expiry of the first timer has passed; and performing network registration of the first subscriber identity if the time of expiry of the first timer has passed while the first subscriber identity is non-active.

2. The method of claim 1, further comprising in association with the step of storing the timer value:

storing a location information of the communication terminal associated with the first subscriber identity.

3. The method of claim 1, wherein the timer value comprises a time left until the first timer expires, and wherein the step of determining whether the time of expiry of the first timer has passed comprises:

determining whether an elapsed time since the first subscriber identity is active exceeds the stored time left until the timer expires.

4. The method of claim 1, wherein the steps of de-activating the first subscriber identity and activating the second subscriber identity comprise:

resetting a telecommunication stack of the communication terminal to a state associated with the second subscriber identity.

5. The method of claim 1, wherein the communication terminal is a multiple subscriber identity terminal, and wherein the step of initiating the active subscriber identity switch comprises:

receiving a subscriber identity switch request via a user interface of the communication terminal.

6. The method of claim 1, wherein the communication terminal is a single subscriber identity terminal, and wherein the step of initiating the active subscriber identity switch comprises:

detecting a subscriber identity switch at a subscriber identity unit of the communication terminal.

7. A controller for a communication terminal, wherein the communication terminal is capable at each moment in time of having only one active subscriber identity, and wherein the communication terminal comprises:

a telecommunication stack adapted to support a currently active subscriber identity;

at least one memory unit adapted to store, for each of a plurality of subscriber identities, at least one parameter associated with a time of expiry of a timer associated with the respective subscriber identity;

the controller being adapted to:

maintain, while a first subscriber identity is active and registered, a first periodic timer associated with the first subscriber identity;

initiate an active subscriber identity switch of the communication terminal from the first subscriber identity to a second subscriber identity and maintaining the first subscriber identity as registered;

stop the first periodic timer in response to the active subscriber identity switch;

cause extraction of a timer value based on a time when the first periodic timer is stopped and storing the timer value in the at least one memory unit;

de-activate the first subscriber identity;

activate the second subscriber identity;

de-activate the second subscriber identity; and activate the first subscriber identity and then determine, based on at least the stored timer value, whether a time of expiry of the first timer has passed; and cause the communication terminal to perform network registration of the another subscriber identity if the time of expiry of the first timer has passed while the first subscriber identity is non-active.

8. The controller of claim 7, wherein the at least one memory unit is further adapted to store, for each of the plurality of subscriber identities, a location information of the communication terminal associated with the respective subscriber identity, the controller being further adapted to, in association with causing extraction and storing of the timer value:

cause extraction of the location information of the communication terminal associated with the first subscriber identity from the telecommunication stack and storing of the extracted location information in the at least one memory unit.

9. A device adapted to switch active subscriber identity of a communication terminal, wherein the communication terminal is capable at each moment in time of having only one active subscriber identity, the device comprising:

a telecommunication stack adapted to support a currently active subscriber identity;

at least one memory unit adapted to store, for each of a plurality of subscriber identities, at least one parameter associated with a time of expiry of a timer associated with the respective subscriber identity; and the controller of claim 7.

10. The device according to claim 9, wherein the device is a multiple subscriber identity terminal, further comprising a user interface for inputting a subscriber identity switch request.

11. The method of claim 1, wherein if the time of expiry of the first timer has not passed, starting the first timer from a time value based on the timer value.

12. The controller of claim 7, wherein the controller is adapted to start the first timer from a time value based on the timer value if the time of expiry of the first timer has not passed.

13. A method of switching active subscriber identity of a communication terminal from a first subscriber identity to a second subscriber identity, wherein the communication terminal is capable at each moment in time of having only one active subscriber identity, the method comprising:

stopping a first periodic timer in response to the active subscriber identity switch, wherein the first periodic timer is maintained while the first subscriber identity is active and registered;

storing a first timer value based on a time when the first periodic timer is stopped;

de-activating the first subscriber identity and maintaining the first subscriber identity as registered; and activating the second subscriber identity by determining, based on a second timer value of a second periodic timer maintained while the second subscriber identity was previously active, whether a time of expiry of the second timer has passed;

performing network registration of the second subscriber identity if the time of expiry of the second timer has passed.

14. The method of claim 13, wherein if the time of expiry of the second timer has not passed, starting the second timer from a time value based on the second timer value.

15. The method of claim 13, wherein the communication terminal does not deregister the de-activated first subscriber identity with a communication network.

16. The method of claim 13, wherein the first and second timer values are a remaining time until expiration of the first and second timers, respectively.

17. The method of claim 13, wherein the first and second timer values are respectively a current timer value when the first and second subscriber identities are deactivated.

* * * * *